(12) United States Patent
Lin et al.

(10) Patent No.: US 11,966,352 B2
(45) Date of Patent: Apr. 23, 2024

(54) MODULARIZED RISER SYSTEM

(71) Applicant: Dell Products L.P., Round Rock, TX (US)

(72) Inventors: Yu-Feng Lin, Taipei (TW); Hao-Cheng Ku, Taipei (TW); Yi-Wei Lu, Taipei (TW)

(73) Assignee: Dell Products L.P., Round Rock, TX (US)

( * ) Notice: Subject to any disclaimer, the term of this patent is extended or adjusted under 35 U.S.C. 154(b) by 134 days.

(21) Appl. No.: 17/065,878

(22) Filed: Oct. 8, 2020

(65) Prior Publication Data

US 2022/0114130 A1 Apr. 14, 2022

(51) Int. Cl.
*G06F 13/12* (2006.01)
*G06F 13/42* (2006.01)

(52) U.S. Cl.
CPC .. *G06F 13/4221* (2013.01); *G06F 2213/0026* (2013.01)

(58) Field of Classification Search
CPC ................. G06F 13/00; G06F 13/4221; G06F 2213/0026
See application file for complete search history.

(56) References Cited

U.S. PATENT DOCUMENTS

| | | | |
|---|---|---|---|
| 5,594,621 A * | 1/1997 | van Rumpt | G06F 1/185 439/631 |
| 9,629,291 B1 * | 4/2017 | Chen | G06F 1/186 |
| 9,791,900 B1 * | 10/2017 | Beall | H05K 7/20727 |
| 11,150,705 B1 * | 10/2021 | Hsieh | H05K 7/1487 |
| 2006/0133059 A1 * | 6/2006 | Dean | G06F 1/186 361/801 |
| 2010/0082964 A1 * | 4/2010 | Wang | G06F 9/4411 714/36 |
| 2012/0020037 A1 * | 1/2012 | Chiu | G06F 1/185 361/759 |
| 2016/0081218 A1 * | 3/2016 | Fietz | H05K 7/1489 361/679.58 |
| 2016/0286678 A1 * | 9/2016 | Venugopal | G06F 13/4068 |
| 2022/0057848 A1 * | 2/2022 | Chang | H05K 5/0265 |

* cited by examiner

*Primary Examiner* — Henry Tsai
*Assistant Examiner* — Kim T Huynh
(74) *Attorney, Agent, or Firm* — Norton Rose Fulbright US LLP

(57) ABSTRACT

An information handling system with modular riser components for receiving expansion cards having various requirements. The system includes a riser body assembly having a common support structure for receiving expansion cards. The common support structure may be coupled to different expansion structures to provide support of expansion cards having requirements that would not be met by the common support structure alone.

20 Claims, 14 Drawing Sheets

MODULARIZED RISER SYSTEM

FIELD OF THE DISCLOSURE

The instant disclosure relates to risers for expansion cards, such as PCIe cards, in an information handling system. More specifically, portions of this disclosure relate to a modularized riser system with a riser body assembly having a common support structure that may be coupled to an extension structure to support various types of expansion cards.

BACKGROUND

As the value and use of information continues to increase, individuals and businesses seek additional ways to process and store information. One option available to users is information handling systems. An information handling system ("IHS") generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems may include a Peripheral Component Interconnect (PCI) bus (which, used herein, includes a Peripheral Component Interconnect Express (PCIe) bus), for I/O functions with PCI components such as expansion cards (e.g., modems, sound card, video cards, etc.). Expansion cards may vary in size and weight and may generate various amounts of heat when involved with I/O functions, requiring the information handling system to have PCI buses uniquely capable of performing I/O functions with such expansion cards without such cards becoming damaged due to lack of support or by overheating. The cost to include unique PCI buses in an information handling system is significant as each such bus must be designed and manufactured to accept only the expected type(s) of expansion card(s) or risk including unnecessarily expensive features (e.g., stronger than necessary support structures, thermal controls, etc.).

Shortcomings mentioned here are only representative and are included to highlight problems that the inventors have identified with respect to existing information handling systems and sought to improve upon. Aspects of the information handling systems described below may address some or all of the shortcomings as well as others known in the art. Aspects of the improved information handling systems described below may present other benefits than, and be used in other applications than, those described above.

SUMMARY

A modular riser may include components for receiving expansion cards having various requirements. The modular riser may include a common riser body assembly that may be installed as part of an IHS and have a common support structure for receiving expansion cards. The common support structure only provides support for some expansion cards, such as those that have only basic requirements on half-length or half-height printed circuit board (PCB) expansion cards. Not including more robust features in the support structure reduces the cost to design and manufacture the support structure relative to a similar support structure including such features. The common riser body of the modular riser may be coupled to an expansion structure to support larger or heavier cards or cards with additional cooling requirements, when it is desired for an IHS to be able to support expansion cards beyond the capability of the common support structure. This modular and scalable approach provides engineering flexibility and performance optimization while reducing costs. Further, the riser body assemblies may have a unified look and appearance across a portfolio. Additionally, existing common support structures can be easily modified by coupling different expansion structures when desired and expansion structures themselves can be standardized to include common additional components. With this system, expansion card support features, such as thermal features and support elements, can be positioned in a single, easily accessible and modifiable location—the riser body assembly, often on the expansion structure—rather than added to a chassis of an IHS or elsewhere. This modular riser can thus reduce part inventory for riser body assemblies because of the standard nature of the parts and their reusability.

According to some embodiments, the common support structure can include a frame for supporting half-length expansion cards made from, for example, plastic, aluminum or steel. The common support structure can include an adjustable support for accommodating low-profile (such as half-height or half-profile) and full-profile expansion cards. The adjustable support can be moved to provide access (e.g., finger access) to the interior of the riser body assembly to permit, for example, installation or removal of an expansion card without having to remove the support structure or other components of the riser body assembly. The common support structure can have different configuration and work alone or across different platforms or different riser slots. The common support structure can have different configurations such an R1, R3, or R4 configuration.

According to some embodiments, an expansion structure can be coupled to a common support structure with a tooled or tool-less connection at any location (for example, in a factory or in the field). The expansion structure can be manufactured to different lengths (for example, to accommodate different IHS chassis depths) and, in combination with the common support structure, support longer or heavier expansion cards than the common support structure alone, such as full-length PCIe cards and GPGPU cards. The expansion structure can have a frame made from, for example, plastic, aluminum or steel. The expansion structure can include one or more rock-out preventers for preventing rock-out of an expansion card installed in the riser body assembly. The expansion structure can include a thermal block for directing flowing air across an expansion card installed in the riser body assembly. The expansion structure can include a movable support for an expansion card that can be moved to provide access (e.g., finger access) to the interior of the riser body assembly to permit, for example, installation or removal of an expansion card without having to remove the expansion structure or other components of the riser body assembly.

According to some embodiments, other than moveable supports to provide access to the interior of the riser body assembly, the riser body assembly does not include moveable parts or require an adaptor for different types of expansion structures. The common support structure can include only a single, common profile for coupling a variety of expansion structures. The expansion structures, though configured to have different features and structures, can include only a single, common profile for coupling to the single, common profile of the common support structure. These features reduce the number of modular parts and the cost of designing and manufacturing components of the riser body assembly.

The term "coupled" is defined as connected, although not necessarily directly, and not necessarily mechanically; two items that are "coupled" may be unitary with each other. The terms "a" and "an" are defined as one or more unless this disclosure explicitly requires otherwise. The term "substantially" is defined as largely but not necessarily wholly what is specified (and includes what is specified; e.g., substantially parallel includes parallel), as understood by a person of ordinary skill in the art.

The phrase "and/or" means and or or. To illustrate, A, B, and/or C includes: A alone, B alone, C alone, a combination of A and B, a combination of A and C, a combination of B and C, or a combination of A, B, and C. In other words, "and/or" operates as an inclusive or.

Further, a device or system that is configured in a certain way is configured in at least that way, but it can also be configured in other ways than those specifically described.

The terms "comprise" (and any form of comprise, such as "comprises" and "comprising"), "have" (and any form of have, such as "has" and "having"), and "include" (and any form of include, such as "includes" and "including") are open-ended linking verbs. As a result, an apparatus or system that "comprises," "has," or "includes" one or more elements possesses those one or more elements but is not limited to possessing only those elements. Likewise, a method that "comprises," "has," or "includes," one or more steps possesses those one or more steps, but is not limited to possessing only those one or more steps.

The foregoing has outlined rather broadly certain features and technical advantages of embodiments of the present invention in order that the detailed description that follows may be better understood. Additional features and advantages will be described hereinafter that form the subject of the claims of the invention. It should be appreciated by those having ordinary skill in the art that the conception and specific embodiment disclosed may be readily utilized as a basis for modifying or designing other structures for carrying out the same or similar purposes. It should also be realized by those having ordinary skill in the art that such equivalent constructions do not depart from the spirit and scope of the invention as set forth in the appended claims. Additional features will be better understood from the following description when considered in connection with the accompanying figures. It is to be expressly understood, however, that each of the figures is provided for the purpose of illustration and description only and is not intended to limit the present invention.

BRIEF DESCRIPTION OF THE DRAWINGS

For a more complete understanding of the disclosed system and methods, reference is now made to the following descriptions taken in conjunction with the accompanying drawings.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
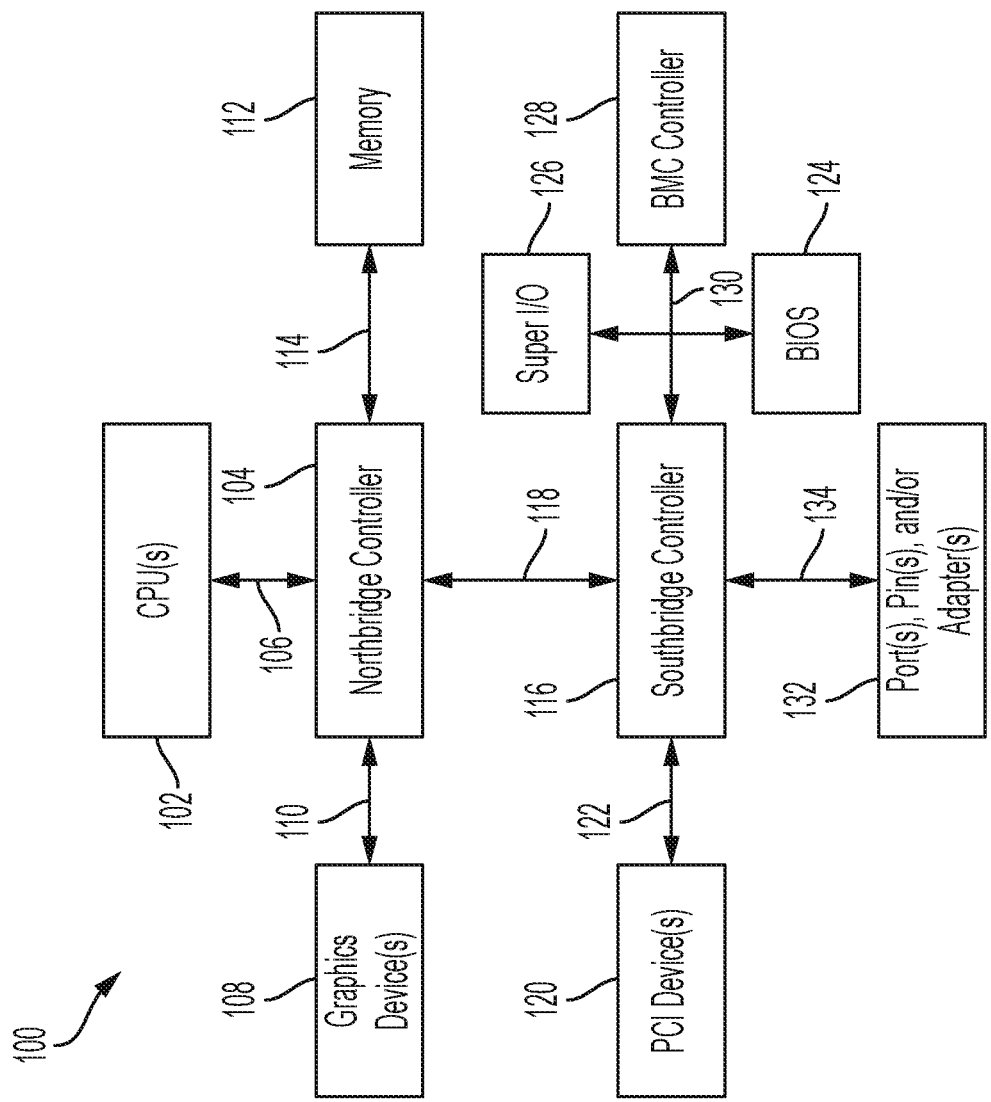
FIG. 1 is a schematic block diagram of an example information handling system according to some embodiments of the disclosure.

An information handling system may include a variety of components to generate, process, display, manipulate, transmit, and receive information. One example of an information handling system 100 is shown in FIG. 1. IHS 100 may include one or more central processing units (CPUs) 102. In some embodiments, IHS 100 may be a single-processor system with a single CPU 102, while in other embodiments IHS 100 may be a multi-processor system including two or more CPUs 102 (e.g., two, four, eight, or any other suitable number). CPU(s) 102 may include any processor capable of executing program instructions. For example, CPU(s) 102 may be processors capable of implementing any of a variety of instruction set architectures (ISAs), such as the x86, POWERPC®, ARM®, SPARC®, or MIPS® ISAs, or any other suitable ISA. In multi-processor systems, each of CPU(s) 102 may commonly, but not necessarily, implement the same ISA.

CPU(s) 102 may be coupled to northbridge controller or chipset 104 via front-side bus 106. The front-side bus 106 may include multiple data links arranged in a set or bus configuration. Northbridge controller 104 may be configured to coordinate I/O traffic between CPU(s) 102 and other components. For example, northbridge controller 104 may be coupled to graphics device(s) 108 (e.g., one or more video cards or adaptors, etc.) via graphics bus 110 (e.g., an Accelerated Graphics Port or AGP bus, a Peripheral Component Interconnect or PCI bus (including a PCI express (PCIe) bus), etc.). Northbridge controller 104 may also be coupled to system memory 112 via memory bus 114. Memory 112 may be configured to store program instructions and/or data accessible by CPU(s) 102. In various embodiments, memory 112 may be implemented using any suitable memory technology, such as static RAM (SRAM), synchronous dynamic RAM (SDRAM), nonvolatile/Flash-type memory, or any other type of memory.

Northbridge controller 104 may be coupled to southbridge controller or chipset 116 via internal bus 118. Generally, southbridge controller 116 may be configured to handle various of IHS 100's I/O operations, and it may provide interfaces such as, for instance, Universal Serial Bus (USB), audio, serial, parallel, Ethernet, etc., via port(s), pin(s), and/or adapter(s) 132 over bus 134. For example, southbridge controller 116 may be configured to allow data to be exchanged between IHS 100 and other devices, such as other IHS s attached to a network. In various embodiments, southbridge controller 116 may support communication via wired or wireless general data networks, such as any suitable type of Ethernet network, for example; via telecommunications/telephony networks such as analog voice networks or digital fiber communications networks; via storage area networks such as Fiber Channel SANs; or via any other suitable type of network and/or protocol.

Southbridge controller 116 may also enable connection to one or more keyboards, keypads, touch screens, scanning devices, voice or optical recognition devices, or any other devices suitable for entering or retrieving data. Multiple I/O devices may be present in IHS 100. In some embodiments, I/O devices may be separate from IHS 100 and may interact with IHS 100 through a wired or wireless connection. As shown, southbridge controller 116 may be further coupled to one or more PCI (including PCIe) devices 120 (e.g., modems, network cards, sound cards, video cards, etc.) via PCI bus 122. Southbridge controller 116 may also be coupled to Basic I/O System (BIOS) 124, Super I/O Controller 126, and Baseboard Management Controller (BMC) 128 via Low Pin Count (LPC) bus 130.

BIOS 124 may include non-volatile memory having program instructions stored thereon. The instructions stored on the BIOS may be usable CPU(s) 102 to initialize and test other hardware components and/or to load an Operating System (OS) onto IHS 100, for example during a pre-boot stage. For example, BIOS may also refer to a set of instructions, stored on BIOS 124, that are executed by CPU(s) 102. As such, BIOS 124 may include a firmware interface that allows CPU(s) 102 to load and execute certain firmware, as described in more detail below. In some cases, such firmware may include program code that is compatible with the Unified Extensible Firmware Interface (UEFI) specification, although other types of firmware may be used.

BMC controller 128 may include non-volatile memory having program instructions stored thereon that are usable by CPU(s) 102 to enable remote management of IHS 100. For example, BMC controller 128 may enable a user to discover, configure, and manage BMC controller 128, setup configuration options, resolve and administer hardware or software problems, etc. Additionally or alternatively, BMC controller 128 may include one or more firmware volumes, each volume having one or more firmware files used by the BIOS' firmware interface to initialize and test components of IHS 100.

Super I/O Controller 126 combines interfaces for a variety of lower bandwidth or low data rate devices. Those devices may include, for example, floppy disks, parallel ports, keyboard and mouse, temperature sensor and fan speed monitoring, etc.

In some embodiments, IHS 100 may be configured to access different types of computer-accessible media separate from memory 112. Generally speaking, a computer-accessible medium may include any tangible, non-transitory storage media or memory media such as electronic, magnetic, or optical media—e.g., magnetic disk, a hard drive, a CD/DVD-ROM, a Flash memory, etc. coupled to IHS 100 via northbridge controller 104 and/or southbridge controller 116.

In some embodiments, northbridge controller 104 may be combined with southbridge controller 116, and/or be at least partially incorporated into CPU(s) 102. In other implementations, one or more of the devices or components shown in FIG. 1 may be absent, or one or more other components may be added. Accordingly, systems and methods described herein may be implemented or executed with other computer system configurations. In some cases, various elements shown in FIG. 1 may be implemented on an expansion card, such as a PCIe card (or more generally a PCI card or any other expansion card) that is installed in a chassis 2000 shown in FIGS. 7A-7D. Those expansion cards may be supported by a modular riser system within the chassis 2000, such as embodiments of a modular riser system described with reference to FIGS. 2-6.

Figure 2B:
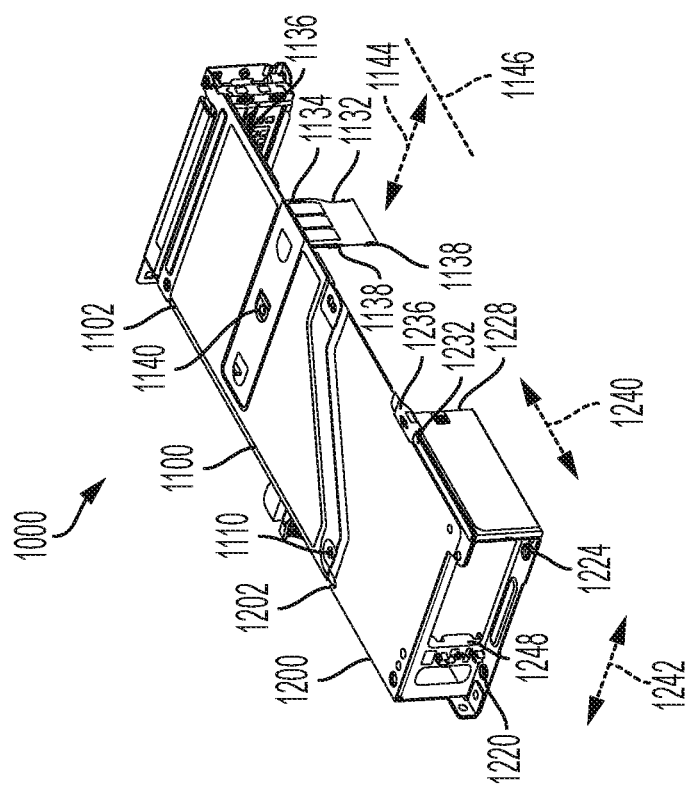
FIGS. 2A and 2B are an unassembled top perspective view and assembled top perspective view, respectively, of an example riser body assembly having a common riser body support structure and expansion structure according to some embodiments of the disclosure.
Figure 2A:
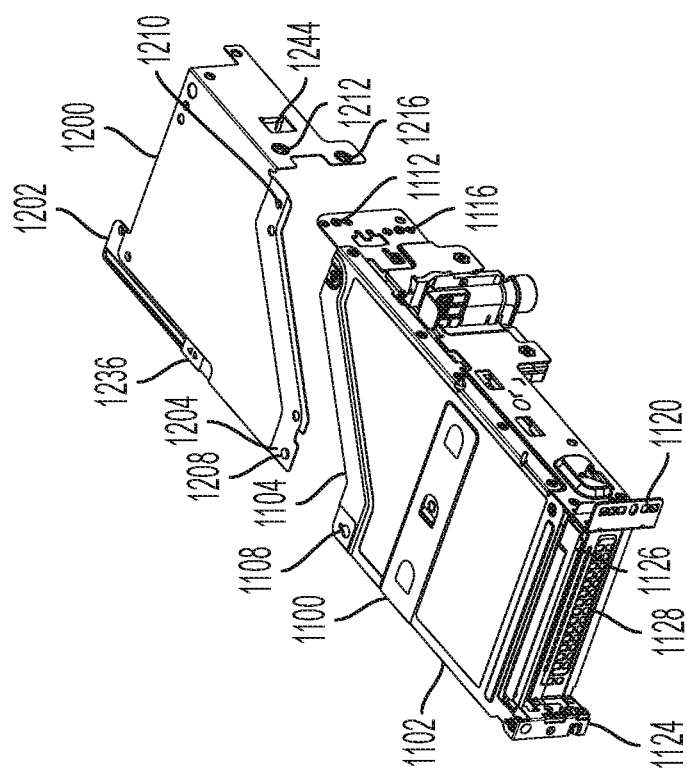

FIGS. 2A and 2B depict a riser body assembly 1000 that may be installed in an information handling system, for example, to receive one or more PCI components such as expansion cards (e.g., modems, sound card, video cards, etc.). As shown, riser body assembly 1000 includes two primary components: a common riser body of support structure 1100 and a separate modular riser extension shown as expansion structure 1200. Various designs of the separate modular expansion structure 1200 may exist to support different size, shape, and weights of different expansion cards as well as to meet different requirements for power, heat, and other factors, of different expansion cards. The common riser body may thus be adapted to suit different expansion cards by attaching different configurations of expansion structure matched to the expansion card being installed in the modular riser.

Figure 3B:
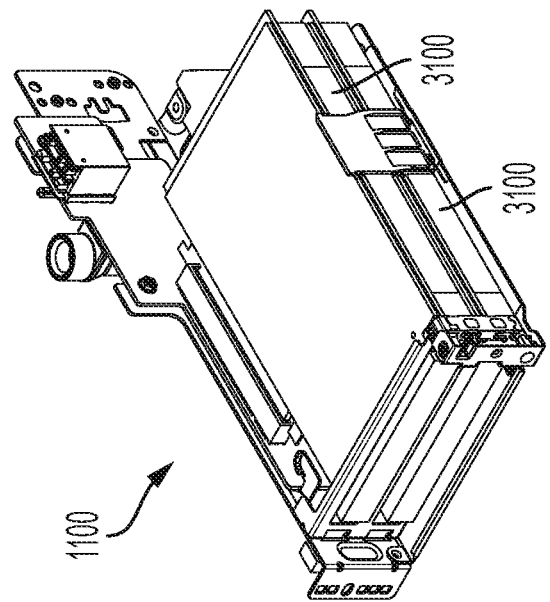
FIGS. 3A and 3B are a top perspective view and a bottom perspective view, respectively, of an example support structure with an R3 configuration connected to full-profile, half-length expansion cards according some embodiments of the disclosure.
Figure 3A:
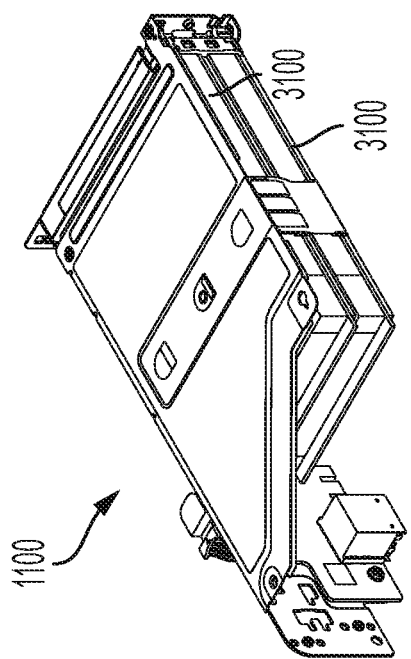
Figure 3D:
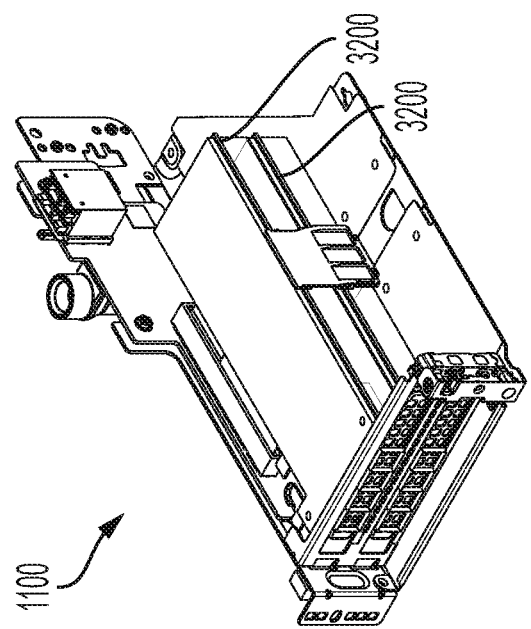
FIGS. 3C and 3D are a top perspective view and a bottom perspective view, respectively, of an example support structure with an R3 configuration connected to low-profile, half-length expansion cards according to some embodiments of the disclosure.
Figure 3C:
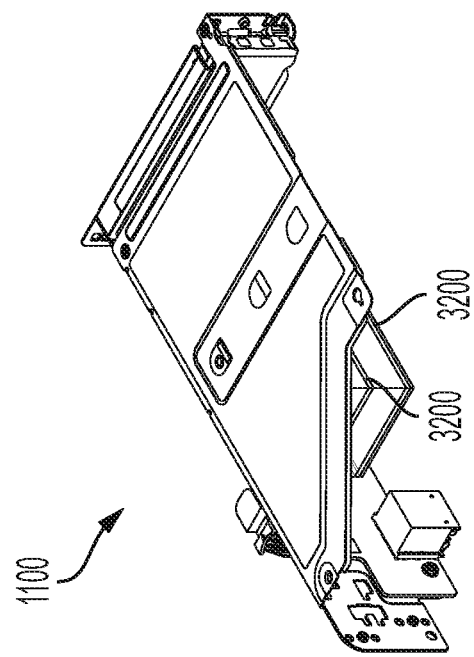
Figure 4B:
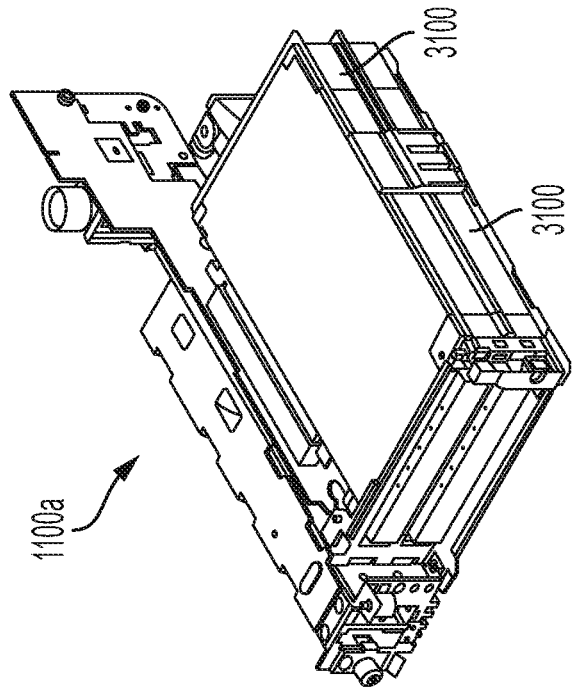
FIGS. 4A and 4B are a top perspective view and bottom perspective view, respectively, of an example support structure with an R1 configuration connected to full-profile, half-length expansion cards according some embodiments of the disclosure.
Figure 4A:
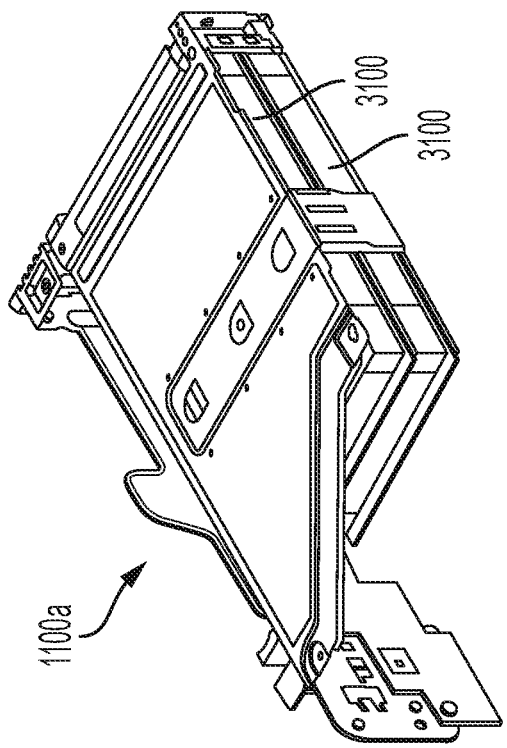
Figure 4D:
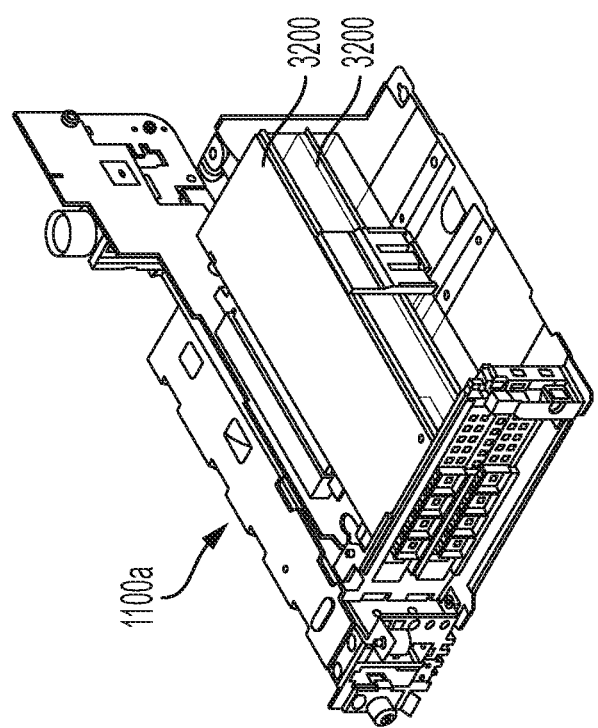
FIGS. 4C and 4D are a top perspective view and bottom perspective view, respectively, of an example support structure with an R1 configuration connected to low-profile, half-length expansion cards according to some embodiments of the disclosure.
Figure 4C:
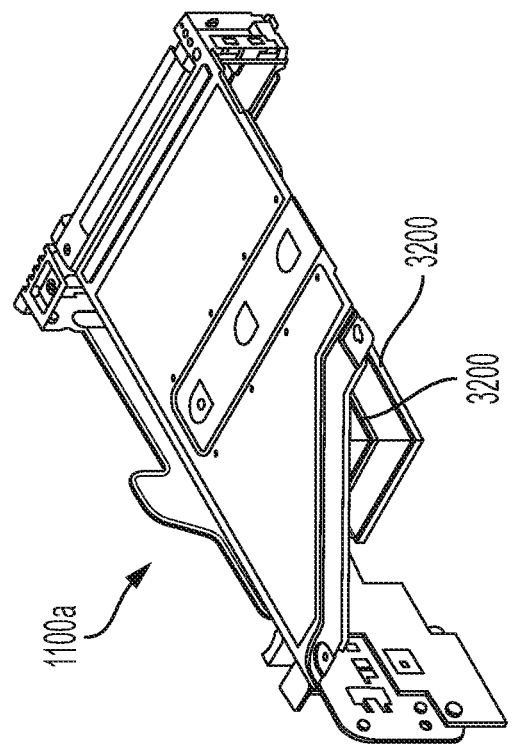
Figure 5B:
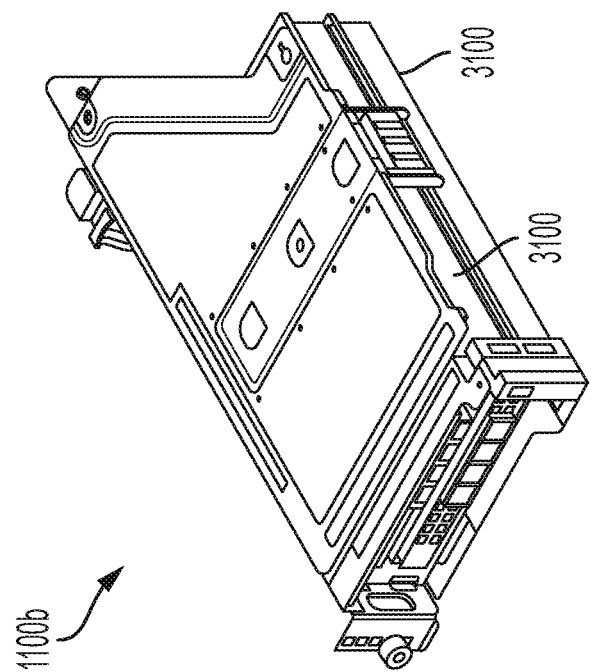
FIGS. 5A and 5B are top perspective views and FIGS. 5C and 5D are bottom perspective views, respectively, of an example support structure with an R4 configuration connected to full-profile, half-length expansion cards according some embodiments of the disclosure.
Figure 5A:
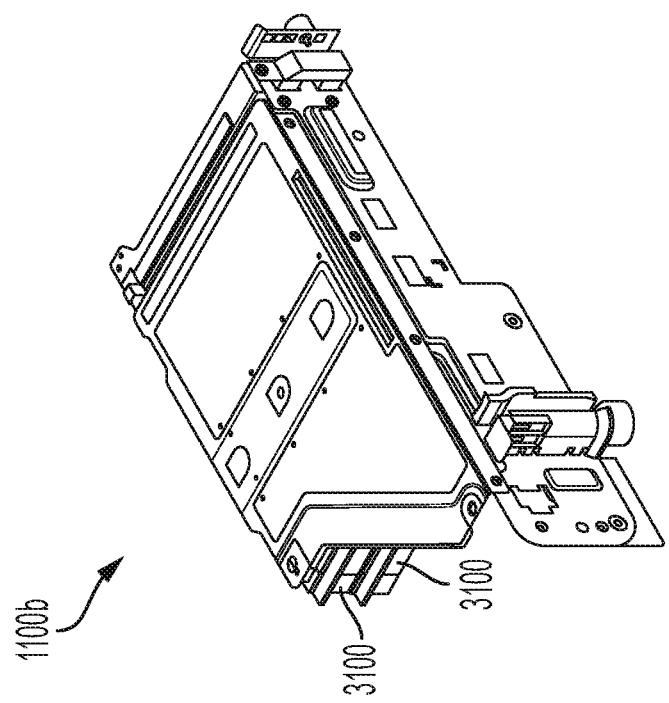
Figure 5C:
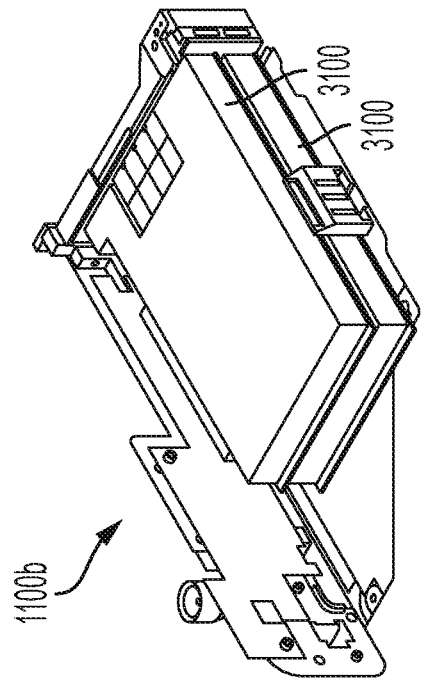
Figure 5D:
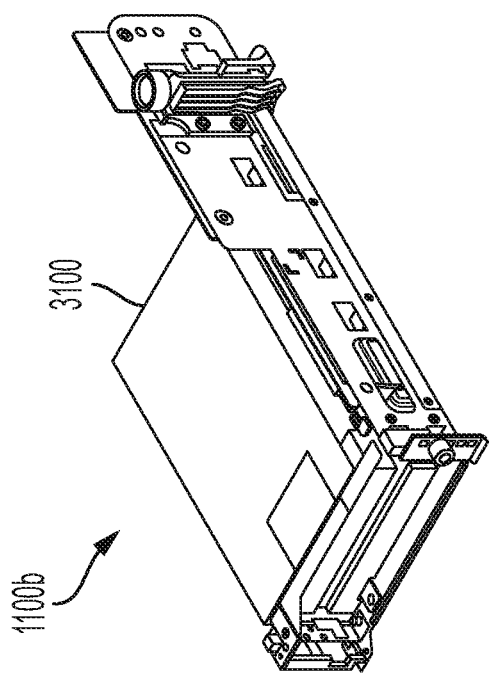
Figure 5F:
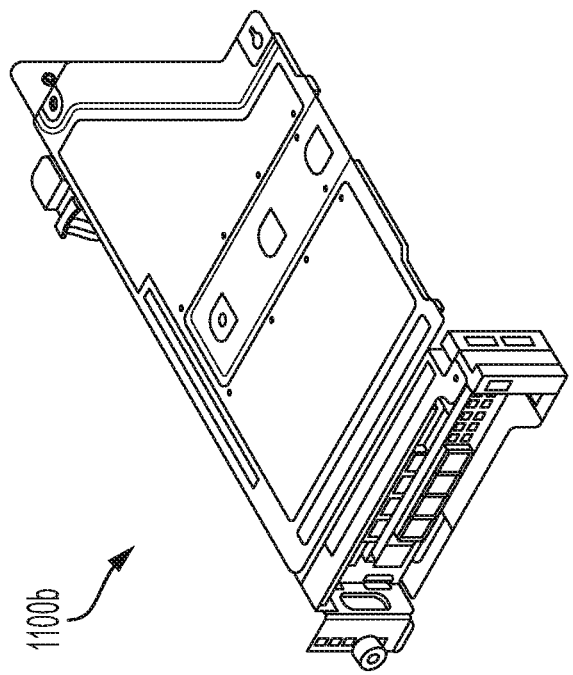
FIGS. 5E and 5F are top perspective views and FIGS. 5G and 5H are bottom perspective views, respectively, of an example support structure with an R4 configuration connected to low-profile, half-length expansion cards according to some embodiments of the disclosure.
Figure 5E:
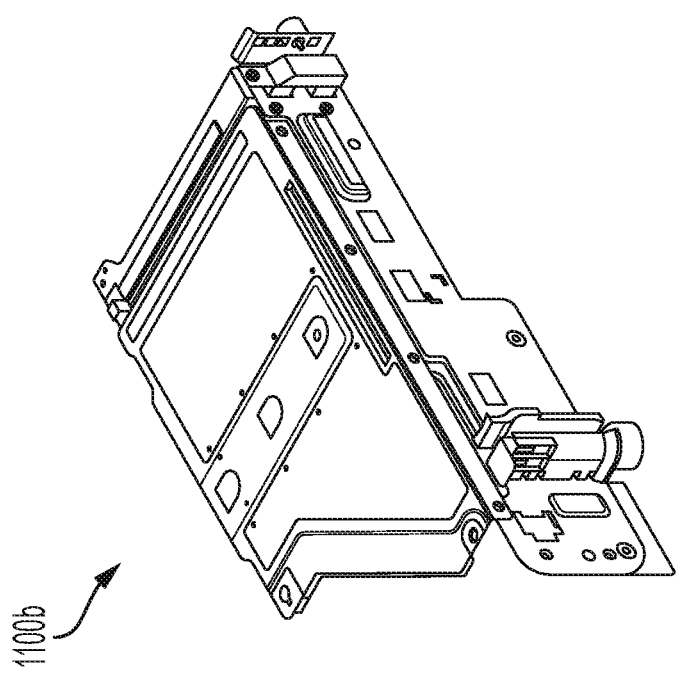
Figure 5G:
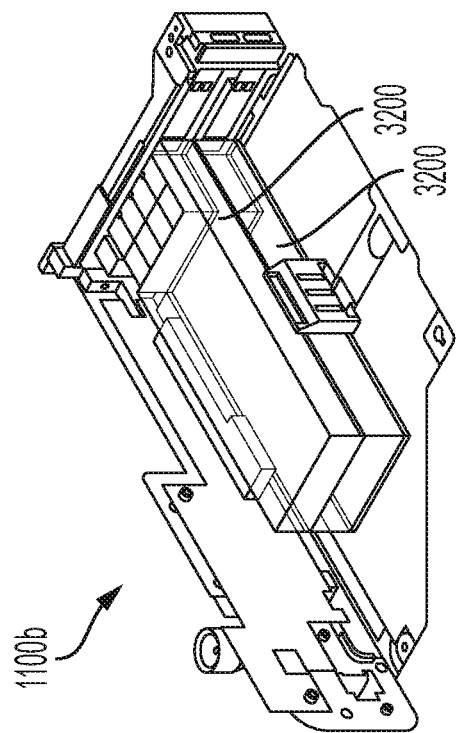
Figure 5H:
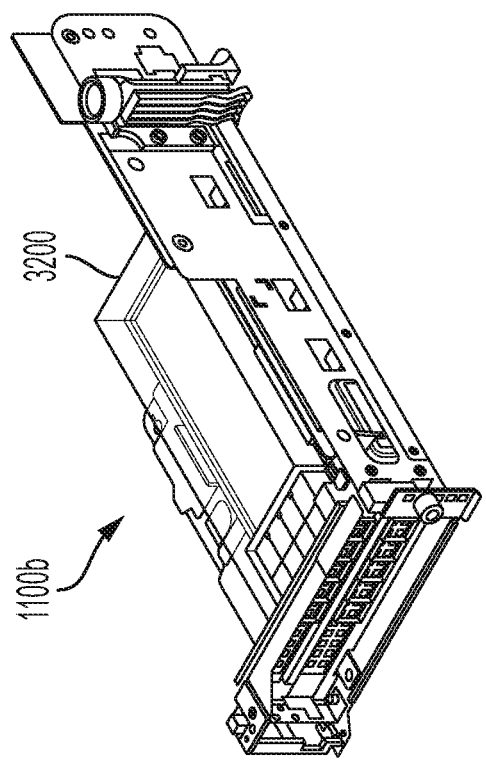
Figure 6:
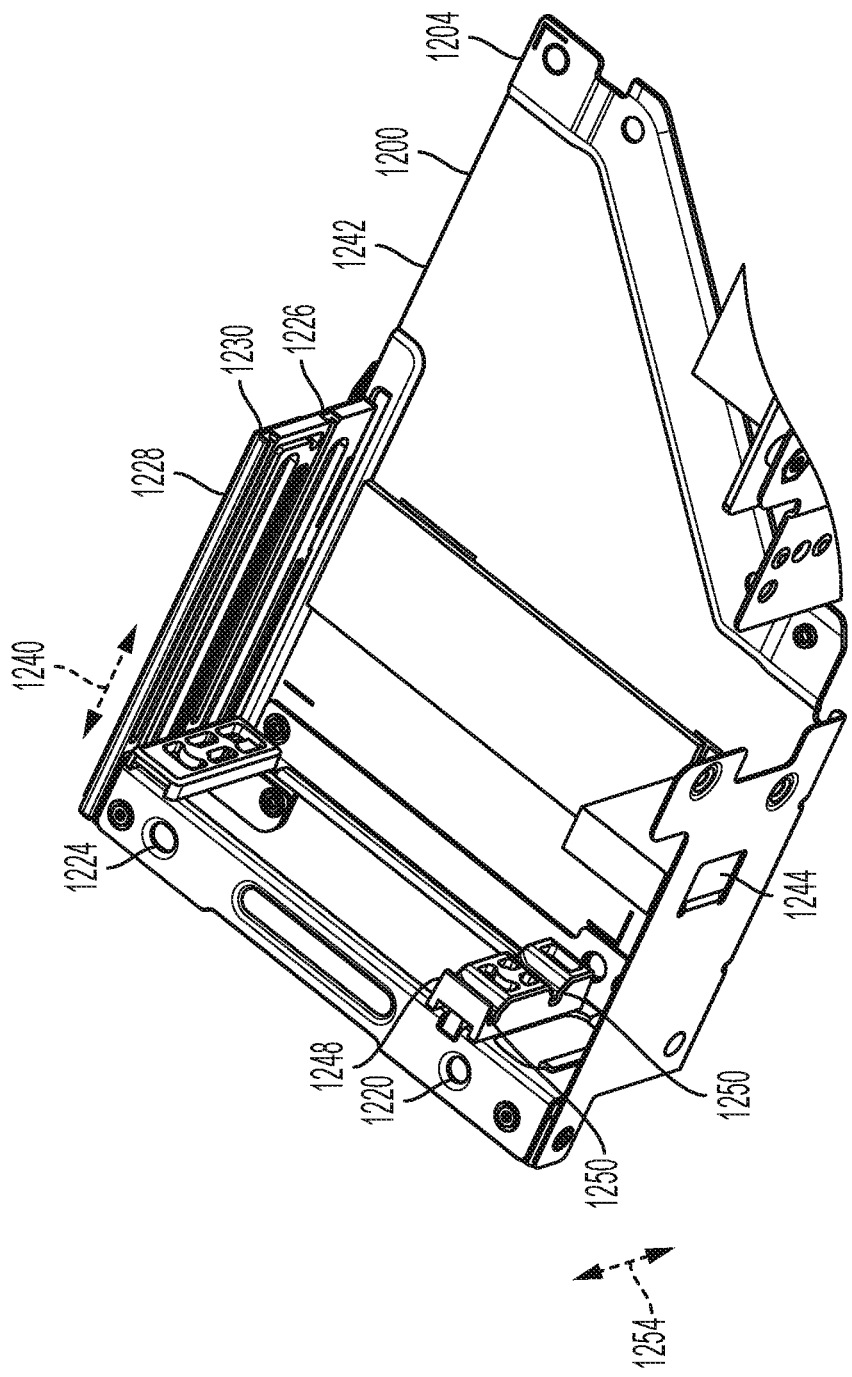
FIG. 6 is a bottom perspective view of a portion of an example expansion structure according to some embodiments of the disclosure.

Support structure 1100 is shown in an R3 configuration, though other types of configurations could be used instead (as shown in FIGS. 4A-7D). Support structure 1100 includes a structural frame 1102 for supporting, at least partially, one or more expansion cards. Frame 1102 may include openings, such as openings 1120, 1124, that are oriented to receive fasteners (e.g., screws, bolts, pins) for coupling support structure 1100 to other structures, for example to a chassis of an IHS (though support structure 1100 could be coupled in other ways as well (e.g., with tool-less fittings, soldering, etc.)). Support structure 1100 may also include plate 1128 (e.g., a riser board) on end 1126 of frame 1102 for supporting and removably coupling one end of one or more expansion cards (such as PCIe cards) to support structure 1100. Support structure 1100 may also include a support 1132 along end 1136 of frame 1102 to provide additional support to one or more expansion cards when installed in support structure 1100 by, for example, supporting a portion of such expansion card(s) on one or more ledges 1138. The end 1134 of support 1132 may move along gap 1130 (shown more clearly in, for example, FIG. 3D) in direction 1144 between end 1136 of frame 1102 and position 1140 (shown more clearly in, again, for example, FIG. 3D) to support different-width expansion cards. In some embodiments, the support 1132 may move along a channel built into a portion of the common riser body support structure 1100, such that the movement of the support 1132 is generally restricted to movement along one dimension. For example, as shown in FIGS. 3A and 3B, support 1132 can support full-profile (or full-width) expansion cards 3100 (i.e., when at end 1136) and, as shown in FIGS. 3C and 3D, support 1132 can support low-profile (or half-width) expansion cards 3200 (i.e., when at position 1140). Additionally, end 1134 of support 1132 may move away from end 1136 of frame 1102 in the direction away from position 1140 to, for example, location 1146 to allow access (e.g., finger access) to the interior of riser body assembly 1000 (e.g., for installation or removal of one or more expansion cards) without having to remove support structure 1100 or other components of riser body assembly 1000 from the rest of the IHS.

Support structure 1100, including frame 1102, may be designed to only provide support for some basic expansion cards, such as those that have only basic requirements. For example, support structure 1100 may only be able to support half-length or shorter and relatively light PCIe cards. Thus, costs of the common riser body structure may be reduced by not incorporating all available features into the support structure 1100. Supporting longer or heavier PCIe cards, or PCIe cards with additional thermal or power requirements, would require additional support, use of stronger material, or an expansion (such as expansion structure 1200 described below). As another example, support structure 1100 may not include a means for cooling an expansion card such as a thermal unit that directs flowing air across an installed expansion card to keep it from overheating during operation. Not including one or more of these features in support structure 1100 reduces the cost to manufacture support structure 1100 relative to a similar support structure including such feature(s). At least in part because of its reduced cost, support structure 1100 may be used as a common support structure (e.g., a modular component) across information handling systems. When it is desired for an IHS to be able to support expansion cards beyond the capability of support structure 1100 (such as, for example in some cases, GPGPU cards), support structure 1100 may be coupled to an expansion structure providing such capabilities such as expansion structure 1200.

Expansion structure 1200 includes a frame, frame 1202, for supporting, at least partially, one or more expansion cards. Frame 1202 includes openings, such as openings 1220, 1224, that are oriented to receive fasteners (e.g., screws, bolts, pins) for coupling expansion structure 1200 to other structures, for example to a chassis of an IHS (though expansion structure 1200 could be coupled in other ways as well (e.g., with tool-less fittings, soldering, etc.)). Expansion structure 1200 may include a movable thermal feature 1228 configured to create an airflow tunnel and is a movable part that can be slide towards a front to provide clearance when servicing (e.g., installing or uninstalling) the expansion card. The feature 1128 may also act as a support 1228 to provide support to one or more expansion cards when installed in riser body assembly 1000 by, for example, supporting a portion of such expansion card(s) on one or more ledges 1226, 1230 (shown more clearly in FIG. 6). Support 1228 may be on the same side of riser body assembly 1000 as end 1134 of support 1132 and may move in slot 1232 (e.g., by pushing slide 1236) in direction 1240 to, for example, location 1242 to allow access (e.g., finger access) to the interior of riser body assembly 1000 (e.g., for installation or removal of one or more expansion cards) without having to remove expansion structure 1200 or other components of riser body assembly 1000 from the rest of the IHS. Expansion structure 1200 may include additional features that may not be present in support structure 1100. For example, expansion structure 1200 may include a thermal block 1244 for directing air flowing through, for example, an IHS, across (e.g., above and below, in contact with) one or more expansion cards installed in riser body assembly 1000, to cool such expansion cards with high thermal loads (such as expansion cards with graphics processing units (GPUs)) and their components by convection. Thermal block 1244 is shown more clearly in FIG. 6. Support 1228 may also function as a thermal block. Expansion structure 1200 may also include a rock-out preventer 1248 (also shown more clearly in FIG. 6) that may include one or more recesses 1250 for receiving an end of an expansion card installed in riser body assembly 1000 (i.e., the end of the expansion card opposite the end coupled to plate 1128). Recesses 1250 may be large enough to allow positioning of an expansion card within them but small enough to prevent dislodging (i.e., "rocking-out") the expansion card(s) when they move in direction 1254 (i.e., toward or away from plate 1242 of frame 1202).

Support structure 1100 may be coupled to expansion structure 1200 by mating profile 1104 of support structure 1100 with profile 1204 of expansion structure 1200 and fastening the two together. For example, raised cylinder 1208 of expansion structure 1200 may be received in retainer opening 1108 of support structure 1100, fastener 1110 of support structure 1100 (e.g., a screw) may be coupled to opening 1210 of expansion structure 1200 (e.g., a threaded opening), and fasteners 1112 and 1116 (e.g., screws or tool-less linkages) of support structure 1100 may be coupled to openings 1212, 1216, respectively, of expansion structure 1200 (e.g., threaded openings). Alternatively or additionally, support structure 1100 and expansion structure 1200 may be coupled in other ways, including without requiring the use of a tool (e.g., press-fitting). Profiles 1104, 1204 may be any desired shape. When coupled together, riser body assembly 1000 may support longer and heavier expansion cards as well as expansion cards requiring more air flow to keep them cool during operation than when expansion structure 1200 is not included.

While FIGS. 2A and 2B depict a specific configuration of support structure 1100 and expansion structure 1200, other embodiments are also included. For example, expansion structure 1200 may be of a different length, have a different number of rock-out preventers, be made of a stronger material, or have other features known in the art or that will be later developed. In one embodiment, support structure 1100 will not include such additional features or be configured for customization. Instead, support structure 1100 will be a common module configured to support expansion cards having more basic requirements. Such system reduces engineering costs (e.g., design costs, manufacture costs) without sacrificing robustness by creating a modular system of inexpensive support structures that may be produced quickly and inexpensively yet easily modified by adding customized expansion structures (though these too can be standardized to commonly desired expansion structures). The expansion structures may be added to newly installed or already installed support structures. One expansion structure may replace another expansion structure, if desired (e.g., if it is desired for the IHS to be able to support a different set of expansion cards). By including the additional features in the expansion structure(s), such features do not need to be included elsewhere in the IHS, such as in the IHS chassis. Including such features elsewhere in the IHS is inefficient because such features must be designed into or later added to the specific IHS where they are needed, rather than in a removable, reusable component such as an expansion structure described herein.

Different support structures may be designed to work across different platforms and standards while still being able to support the same types of expansion cards. For example, FIGS. 4A-4D depict a support structure 1100a that is substantially the same as support structure 1000 except that it is in an R1 configuration. As another example, FIGS. 5A-5H depict a support structure 1100b that is substantially the same as support structure 1000 expect it is in an R4 configuration. As shown, support structures 1100a and 1100b, like support structure 1100, can support both full-profile (i.e., full-width) expansion cards 3100 and low-profile (i.e., half-width) expansion cards 3200. Configurations other than R1/R3/R4 are also contemplated herein, including configurations for profiles and standards that will be developed in the future.

Figure 7A:
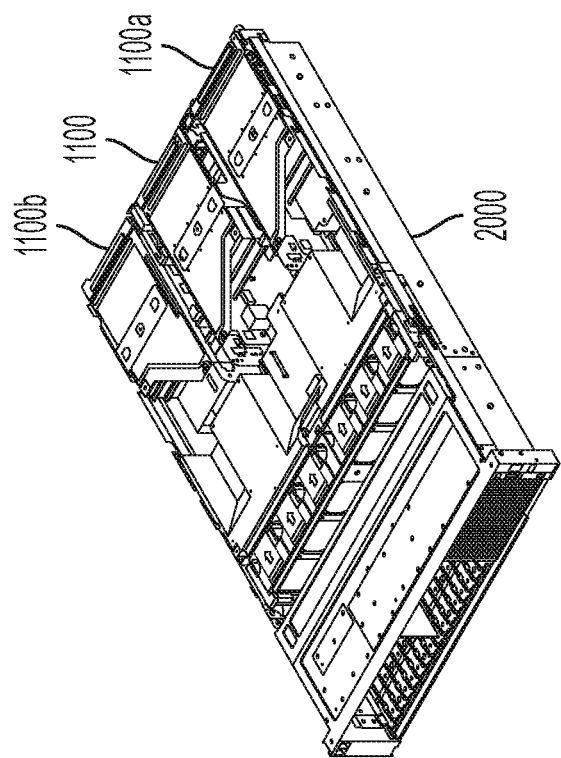
FIGS. 7A and 7B are an unassembled top perspective view and assembled top perspective view, respectively, of an information handling system chassis having a variety of riser body assemblies without expansion structures according to some embodiments of the disclosure.
Figure 7B:
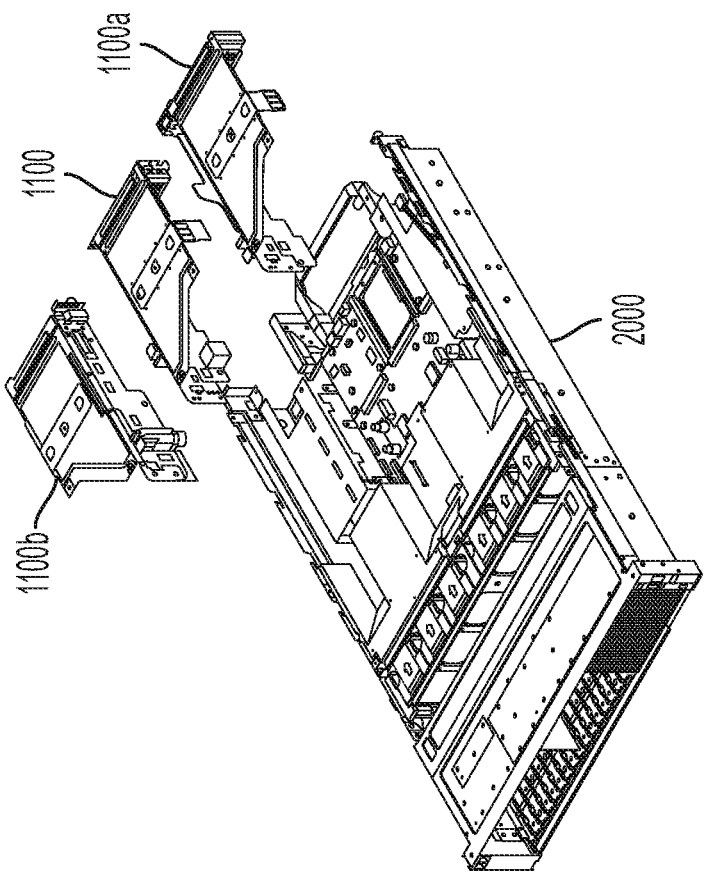
Figure 7D:
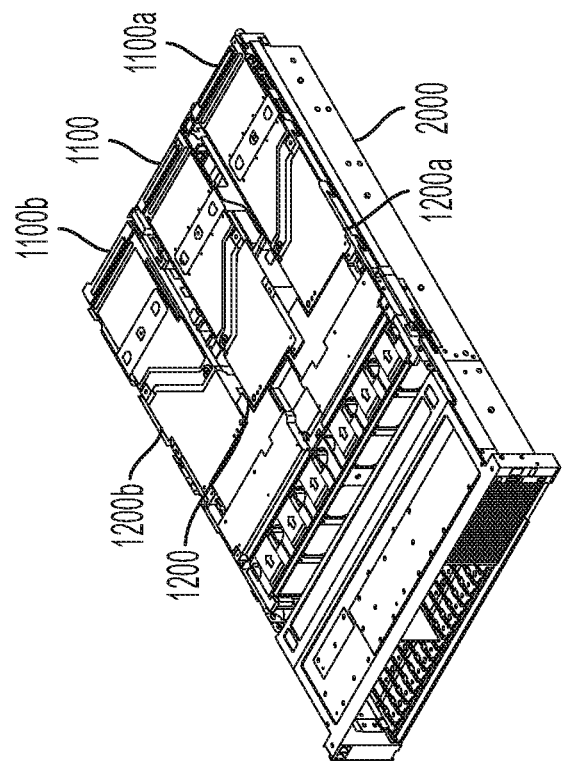
FIGS. 7C and 7D are an unassembled top perspective view and assembled top perspective view, respectively, of an information handling system chassis having a variety of riser body assemblies with expansion structures according to some embodiments of the disclosure.
Figure 7C:
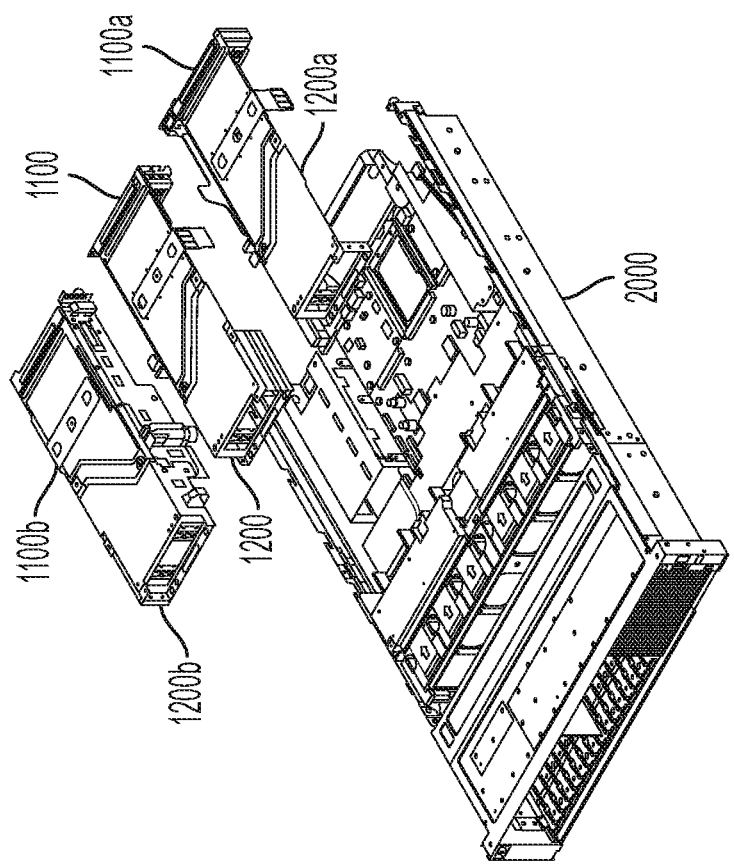

FIGS. 7A and 7B depict an exemplary embodiment of support structures 1100, 1100a, and 1100b installed in an IHS chassis 2000. As shown in FIGS. 7C and 7D, support structures 1100, 1100a, and 1100b may be coupled to corresponding expansion structures 1200, 1200a, and 1200b, respectively, which may each have different desired additional features to accommodate expansion cards that could not otherwise be supported by support structures 1100, 1100a, and 1100b. For example, expansion structure 1200 includes a support 1228 while expansion structure 1200a does not.

Figure 8:
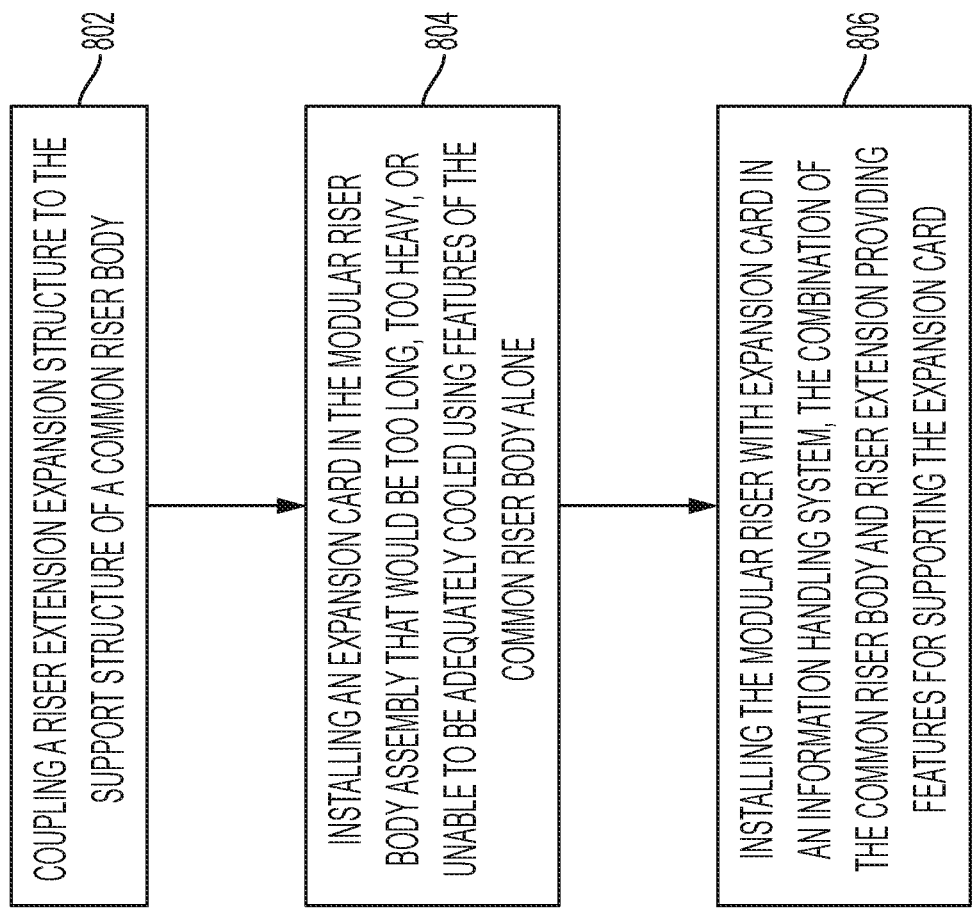
FIG. 8 is a flow chart illustrating a method for installing an expansion card into an information handling system using a modular riser according to some embodiments of the disclosure.

FIG. 8 is a flow chart illustrating a method for installing an expansion card into an information handling system using a modular riser according to some embodiments of the disclosure. A method for initial installation of the expansion card may include, at block 802, with coupling a riser extension expansion structure to the support structure of a common riser body. At block 804, the method continues with installing an expansion card in the modular riser body assembly that would be too long, too heavy, or unable to be adequately cooled using features of the common riser body alone. At block 806, the method continues with installing the modular riser with expansion card in an information handling system, the combination of the common riser body and riser extension providing features for supporting the expansion card. The installation process of blocks 802, 804, and 806 may be repeated after removing the modular riser from the IHS to replace the installed expansion card. In some embodiments, maintenance on the expansion card may be performed without removing the modular riser by adjusting the adjustable supports of the rise structure and/or expansion structure. Other methods for installing the card may include different orders for the coupling at block 802, the installing of the expansion card at block 804, and the installing of the modular riser at block 806. For example, the installation may be performed by installing the expansion card at block 804 followed by coupling the riser extension to the common riser body at block 802, and then installing the modular riser with expansion card into the IHS. As another example, the installation may be performed by installing the common riser body to the IHS, installing the expansion card into the common riser body, and then installing the riser extension on the common riser body.

The schematic flow chart diagram of FIG. 8 is generally set forth as a logical flow chart diagram. The depicted order, labeled steps, and described operations are indicative of aspects of methods of the invention. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagram, they are understood not to limit the scope of the corresponding method. Additionally, the order in which a particular method occurs may or may not strictly adhere to the order of the corresponding steps shown.

Although the present disclosure and certain representative advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the present disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

The claims are not intended to include, and should not be interpreted to include, means-plus- or step-plus-function limitations, unless such a limitation is explicitly recited in a given claim using the phrase(s) "means for" or "step for," respectively.

What is claimed is:

1. An apparatus, comprising:
a modular riser configured to support an expansion card in an information handling system, the modular riser comprising:
 a common riser body comprising a support structure, the support structure comprising:
  a frame to support an expansion card, the frame comprising a first end having a first plate to support and removably couple to the expansion card, a second end opposite the first end and configured to couple to an expansion structure to provide additional support for the expansion card, a base extending between the first and second ends, a first side having a second plate at least partially extending between the first and second ends, and a second side opposite the first side; and
  a moveable support coupled to the base and configured to support the expansion card and to move towards and away from the first side to permit installation or removal of the expansion card from the modular riser.

2. The apparatus of claim 1, wherein the support structure of the common riser body is configured to support an expansion card with basic features, wherein the expansion card is at least one of a low-profile or half-height expansion card.

3. The apparatus of claim 2, wherein the modular riser further comprises the expansion structure, wherein a combination of the expansion structure and the common riser body is configured to support an expansion card with additional features, wherein the expansion card comprises a full-length expansion card.

4. The apparatus of claim 1, wherein the support structure is configured to support a Peripheral Component Interconnect Express (PCIe) card.

5. The apparatus of claim 1, wherein the common riser body is not able to adjust a length of the support structure.

6. The apparatus of claim 1, wherein the support structure is configured to couple to the expansion structure with a tool-less attachment linkage.

7. The apparatus of claim 3, wherein the expansion structure comprises a rock-out preventer configured to prevent the expansion card supported by the support structure from being dislodged by movement of the information handling system.

8. The apparatus of claim 3, wherein the expansion structure comprises a thermal block configured to direct air to flow across an expansion card supported by the support structure.

9. The apparatus of claim 8, wherein the thermal block is configured to provide additional cooling to a graphics processing unit (GPU) of the expansion card.

10. An information handling system, comprising:
a chassis; and
a modular riser configured to support an expansion card in an information handling system, the modular riser coupled to the chassis, the modular riser comprising:
 a common riser body comprising a support structure, the support structure comprising:
  a frame to support the expansion card, the frame comprising a first end having a first plate to support and removably couple to the expansion card, a second end opposite the first end and configured to couple to an expansion structure to provide additional support for the expansion card, a base extending between the first and second ends, a first side having a second plate at least partially extending between the first and second ends, and a second side opposite the first side; and
  a moveable support coupled to the base and configured to support the expansion card and to move towards and away from the first side to permit installation or removal of the expansion card from the modular riser.

11. The information handling system of claim 10, wherein the support structure of the common riser body is configured to support an expansion card with basic features, wherein the expansion card is at least one of a low-profile or half-height expansion card.

12. The information handling system of claim 11, wherein the modular riser further comprises the expansion structure, wherein a combination of the expansion structure and the common riser body is configured to support an expansion card with additional features, wherein the expansion card comprises a full-length expansion card.

13. The information handling system of claim 10, wherein the support structure is configured to support a Peripheral Component Interconnect Express (PCIe) card.

14. The information handling system of claim 10, wherein the common riser body is not able to adjust a length of the support structure.

15. The information handling system of claim 12, wherein the expansion card comprises a graphics processing unit (GPU), the expansion structure further comprising a thermal block configured to direct air to flow across the expansion card supported by the support structure to cool the GPU.

16. A method comprising:
coupling a riser extension expansion structure to a support structure of a common riser body to form a modular riser, wherein the support structure comprises a frame to support an expansion card, the frame comprising a first end having a first plate to support and removably couple to the expansion card, a second end opposite the first end and configured to couple to an expansion structure to provide additional support for the expansion card, a base extending between the first and second ends, a first side having a second plate at least partially extending between the first and second ends, and a second side opposite the first side, and wherein the support structure further comprises a moveable support coupled to the base and configured to support the expansion card and to move towards and away from the first side to permit installation or removal of the expansion card from the modular riser without removing the modular riser from an information handling system;
installing the expansion card in the modular riser, wherein the expansion card would be too long, too heavy, or unable to be adequately cooled using features of the common riser body alone; and
installing the modular riser with the expansion card in the information handling system, the combination of the common riser body and the riser extension expansion structure providing features for supporting the expansion card.

17. The method of claim 16, further comprising moving the moveable support away from the first side and thereafter removing the expansion card from the modular riser body assembly without removing the modular riser from the information handling system.

18. The method of claim 16, wherein the coupling of the riser extension expansion structure to the support structure is performed without the use of a tool.

19. The apparatus of claim 1, wherein the moveable support is configured to move along a channel built into a portion of the base, such that the movement of the moveable support is generally restricted to movement along one dimension.

20. The information handling system of claim 10, wherein the moveable support is configured to move along a channel built into a portion of the base, such that the movement of the moveable support is generally restricted to movement along one dimension.

\* \* \* \* \*